United States Patent [19]
Burkett

[11] Patent Number: 6,057,772
[45] Date of Patent: May 2, 2000

[54] APPARATUS AND METHOD FOR OPTICALLY SENSING LIQUID LEVEL IN COOKING VESSELS

[75] Inventor: Douglas A. Burkett, Eaton, Ohio

[73] Assignee: Henny Penny Corporation, Eaton, Ohio

[21] Appl. No.: 08/969,695

[22] Filed: Nov. 13, 1997

[51] Int. Cl.⁷ .................................................. G08B 21/00
[52] U.S. Cl. ........................ 340/612; 340/618; 340/619; 73/293; 250/577; 250/903; 236/20 R
[58] Field of Search ..................... 340/612, 618, 340/619; 73/209 R, 304 R, 293, 291; 250/577, 903; 236/20 R, 78 B

[56] References Cited

U.S. PATENT DOCUMENTS

| | | | |
|---|---|---|---|
| 4,155,013 | 5/1979 | Spiteri . | |
| 4,242,590 | 12/1980 | von Tlück . | |
| 4,277,773 | 7/1981 | Blatnik | 340/618 |
| 4,665,391 | 5/1987 | Spani | 340/619 |
| 4,670,660 | 6/1987 | Kuhlen et al. . | |
| 4,713,552 | 12/1987 | Denis et al. . | |
| 4,809,551 | 3/1989 | Grossiord . | |
| 4,834,497 | 5/1989 | Angel . | |
| 4,908,783 | 3/1990 | Maier | 73/290 R |
| 4,961,069 | 10/1990 | Tsaprazis | 340/619 |
| 4,987,776 | 1/1991 | Koon | 340/618 |
| 4,998,022 | 3/1991 | Tregay . | |
| 5,088,324 | 2/1992 | Nemeth . | |
| 5,159,834 | 11/1992 | Eisele . | |
| 5,161,411 | 11/1992 | Cruickshank | 250/577 |
| 5,232,151 | 8/1993 | Mercer et al. . | |
| 5,253,521 | 10/1993 | Abramovich et al. | 340/618 |
| 5,362,971 | 11/1994 | McMahon et al. . | |
| 5,399,876 | 3/1995 | LaClair . | |
| 5,519,638 | 5/1996 | Tiao | 340/509 |
| 5,534,708 | 7/1996 | Ellinger et al. . | |
| 5,719,556 | 2/1998 | Albin et al. | 340/618 |
| 5,880,480 | 3/1999 | Ellinger et al. | 250/577 |

FOREIGN PATENT DOCUMENTS

| | | |
|---|---|---|
| 2363787 | 3/1978 | France . |
| 2726082 | 12/1978 | Germany . |
| 3247192 | 7/1984 | Germany . |

Primary Examiner—Nina Tong
Attorney, Agent, or Firm—Baker Botts L.L.P.

[57] ABSTRACT

An apparatus and method for optical sensing of liquid level in cooking vessels are disclosed. The apparatus comprises: a first sensor (P1) for detecting a liquid and generating a first signal indicating a vessel level of the detected liquid above a desired liquid level (110) in the cooking vessel (102); a second sensor (P2) for detecting the liquid and generating a second signal indicating the vessel level of the detected liquid below the desired liquid level (110) in the cooking vessel (102); a third sensor (P3) for detecting the liquid and generating a third signal indicating the vessel level of the detected liquid (110) at the bottom of the cooking vessel (102); and a controller (108) for receiving the signals and for determining the vessel level in the cooking vessel (102). The method for optically sensing liquid level in a cooking vessel comprises the following steps: first, sensing a vessel level of the liquid at a plurality of locations with a plurality of sensors positioned within the cooking vessel; second, generating at least one analog signal indicating a vessel level of the liquid at at least one of the sensors; third, processing the at least one analog signal; fourth, determining the vessel level of the liquid within the cooking vessel; and fifth, displaying the vessel level within the cooking vessel.

21 Claims, 2 Drawing Sheets

APPARATUS AND METHOD FOR OPTICALLY SENSING LIQUID LEVEL IN COOKING VESSELS

BACKGROUND OF THE INVENTION

1. Field of the Invention

This invention relates to deep fat cooking vessels generally, and more particularly to an apparatus and method for optical sensing of liquid level in such cooking vessels.

2. Description of Related Art

Large capacity, pressurized, deep fat fryer cookers (referred to as deep fat flyers, cooking devices, cookers, and the like) have been devised for cooking products in a heated and/or pressurized environment. Typically, such devices may include a cooking vessel, often referred to as a frypot, which may be filled with a cooking substance, e.g., oil, shortening, water, or the like, and heating devices surrounding or immersed in the vessel, or both, for heating the cooking substance. Products to be cooked are placed in the cooking vessel, either directly or in a container, such as a wire basket, and are cooked for a desired length of time.

The level of the cooking substance is an important factor in the overall efficiency of the cooking vessel. If the level of the cooking substance in the cooking vessel is too low, or if the cooking vessel is empty, the fryer may overheat, resulting in a risk of fire or equipment damage. In particular, the fryer may be damaged by such "dry firing."

If the level of the cooking substance is too high, placing a food product in the cooking vessel may cause the cooking substance to overflow or boil over and out of the cooking vessel. This too may result in fire or equipment damage. Moreover, such cooking substance boil-over or overflow may result in increased facility maintenance costs and increased cooking substance loss. This may further cause a reduction in operating efficiency. Thus, a desired cooking vessel cooking substance level incorporates both considerations; namely, providing a liquid level that is high enough to prevent "dry firing" and to cook food efficiently, while low enough to prevent boil-overs and excess cooking substance use.

In order to maintain the fryer operating efficiently, the cooking substance may periodically be drained from the cooking vessel to a drain pan. Unless an operator is attentive, the drain pan may already be filled with a cooking substance or other material, and a cooking substance spill may result, causing unsanitary working conditions and decreased productivity.

SUMMARY OF THE INVENTION

These and other problems are overcome by the apparatus and method for optically sensing liquid level in cooking vessels described below.

It is another object of the invention to provide a cooking vessel having a plurality of sensors for sensing a liquid level in the cooking vessel.

It is still another object of the invention to provide a drain pan having at least one sensor for sensing a liquid level in the drain pan.

In one embodiment, an apparatus for optically sensing liquid level in a cooking vessel is disclosed. The apparatus comprises: a first sensor for detecting a liquid and generating a first signal indicating a vessel level of the detected liquid above a desired liquid level in the cooking vessel; a second sensor for detecting the liquid and generating a second signal indicating the vessel level of the detected liquid below the desired liquid level in the cooking vessel; a third sensor for detecting the liquid and generating a third signal indicating the vessel level of the detected liquid at the bottom of the cooking vessel; and a controller for receiving the signals and for determining the vessel level in the cooking vessel.

In another embodiment, a method for optically sensing liquid level in a cooking vessel comprises the following steps: sensing a vessel level of the liquid at a plurality of locations with a plurality of sensors positioned within the cooking vessel; generating at least one analog signal indicating a vessel level of the liquid at at least one of the sensors; processing the at least one analog signal; determining the vessel level of the liquid within the cooking vessel; and displaying the vessel level within the cooking vessel.

Other objects, features, and advantages will be understood in view of the following description of preferred embodiments with respect to the drawings.

BRIEF DESCRIPTION OF THE DRAWINGS

For a more complete understanding of the present invention and the objects, features, and advantages thereof, reference is now made to the following descriptions taken in connection with the accompanying drawings in which.

DETAILED DESCRIPTION OF THE PREFERRED EMBODIMENTS

Figure 1:
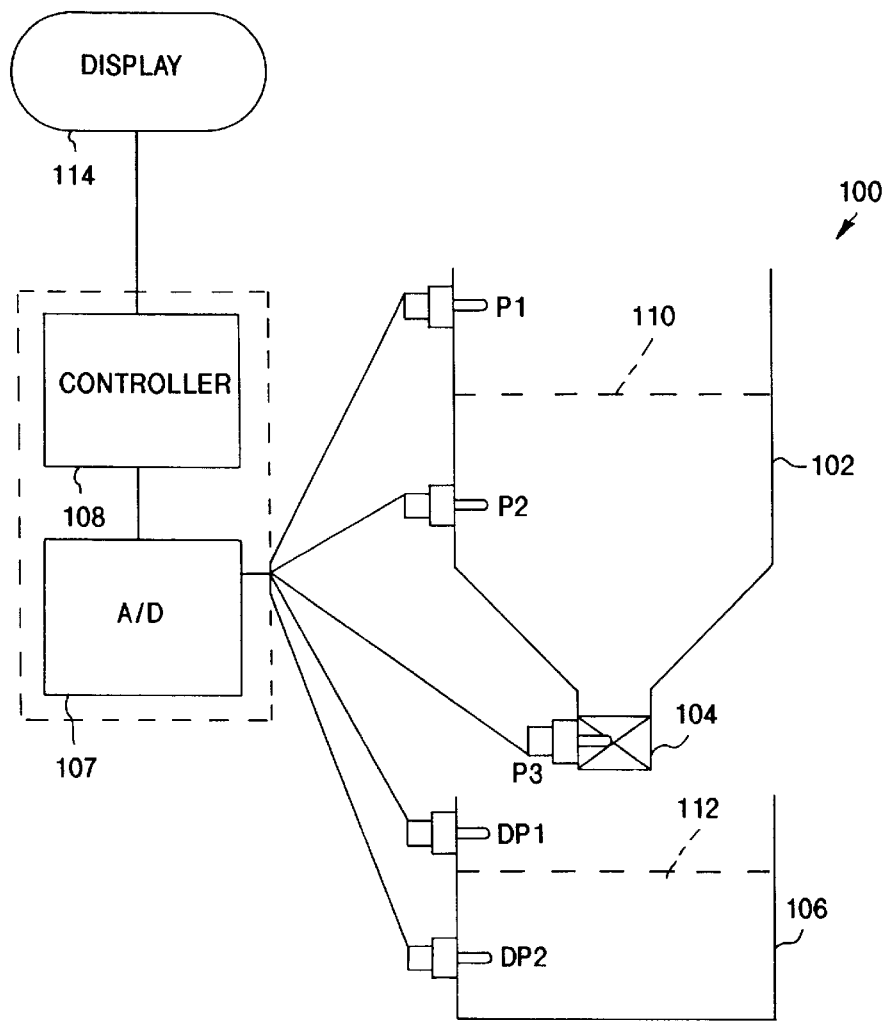
FIG. 1 illustrates an apparatus for optically sensing a liquid level in a cooking vessel in accordance with the present invention.
Figure 2A:
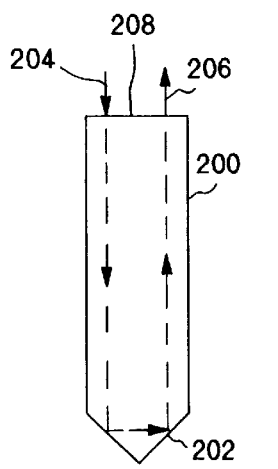
FIG. 2a is a schematic illustration of a fiber optic rod immersed in a fluid which has an index of refraction that is less than the index of refraction of the rod.
Figure 2B:
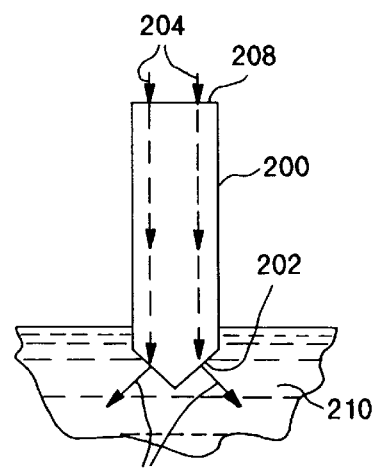
FIG. 2b is a schematic illustration of a fiber optic rod immersed in a liquid, such as oil or water, which has an index of refraction that is greater than the index of refraction of the rod.
Figure 3:
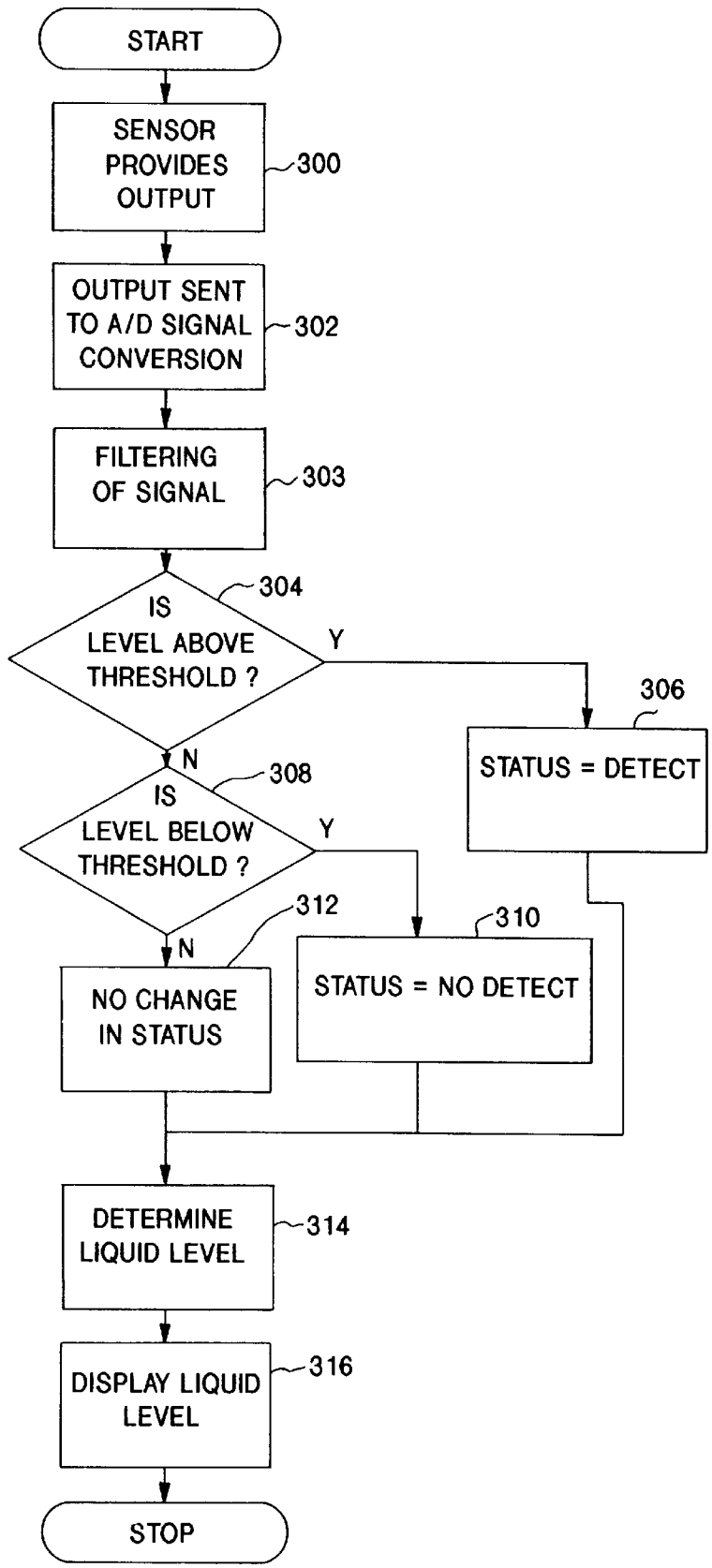
FIG. 3 is a flowchart illustrating a method for optically sensing a liquid level in a cooking vessel in accordance with the present invention.

Preferred embodiments of the present invention and their advantages may be better understood by referring to FIGS. 1 through 3 of the drawings. The same numerals are used for corresponding parts of the various drawings.

Referring to FIG. 1, a fryer system 100 is depicted. Fryer system 100 comprises a cooking vessel 102, including a drain valve 104, which permits the cooking substance to be drained from cooking vessel 102. The cooking substance in cooking vessel has a desired liquid level 110.

Cooking vessel 102 further includes a plurality of sensors used to determine the actual liquid level in the cooking vessel. These sensors may be optical sensors, such as optical sensor Model No. 5242-GC-0002, manufactured by Kinematics & Controls Corporation, Deer Park, N.Y. These optical sensors generate a voltage level signal change when the index of refraction of the medium at the sensor tip changes.

Referring to FIGS. 2a and b, low-loss, fiber optics may be used to transmit light from a first end of a rod 200 to a second end. If the first end of rod 200 is cut and polished to form a prism 202, and if prism 202 is exposed to air, incident light 204 that passes along rod 200 and strikes prism 202 is reflected back along light path 206 with little loss. If, however, with all other conditions unchanged, prism 202 is brought into contact with a liquid 210 having a higher refractive index than that of rod 200, most of the light conducted through rod 200 is absorbed at absorption points 212 into liquid 210, while little light is reflected back to source end 208.

Each rod 200 has an integral light source (not shown) that directs incident light 204 toward prism tip 202, and a photo transducer (not shown) that receives returned light. This transducer returns an analog voltage signal proportional to the amount of returned light. Due to the principles of reflection on which the sensor operates, if the sensor is in contact with air, substantially all of the light directed toward prism tip 202 is reflected back to the transducer, and the sensor will return an equivalent voltage signal. If the sensor is in contact with a medium, such as a cooking substance, substantially all of the light directed toward prism tip 202 is absorbed by the medium and not reflected back to the transducer, resulting a very small voltage signal.

A plurality of sensors are configured in cooking vessel 102 to provide signals that are used to determine liquid level 110 in cooking vessel 102. In a first embodiment, three sensors P1–P3 are provided for cooking vessel 102. Sensor P1 is the uppermost sensor; sensor P3 is the lowest sensor, and sensor P2 is between sensors P1 and P3. Preferably, P2 is positioned above the heater elements (not shown) in order to prevent dry firing. In one embodiment, sensor P3 is located within the lower 35% of the volume of cooking vessel 102, while sensor P1 is located within 10% of the volume of cooking vessel 102 above a desired liquid level and sensor P2 is located within 10% of the volume of cooking vessel 102 below a desired liquid level. This sensor configuration is useful for determining if the cooking vessel liquid level 110 is above the desired level, at the desired level, below the desired level, or if cooking vessel 102 is empty. Other numbers of sensors and configurations may be used as desired.

In another embodiment, sensors P1 and P2 are slidably mounted in cooking vessel 102. Thus, the position of sensors P1 and P2 may be adjusted to different positions to compensate for different operating conditions, such as different types of cooking substances, different types of food products, different heating levels, and the like.

Fryer system 100 further includes analog-to-digital (A/D) signal converter 107 and a controller 108. Controller 108 may be microprocessor based and may receive and process the signals generated by the plurality of sensors in order to determine liquid level 110 in cooking vessel 102. A suitable controller 108 is the MC68HC11 microcontroller, manufactured by Motorola, Inc. of Schaumburg, Ill. The MC68HC11 microcontroller also includes an A/D signal converter, which may be used as A/D signal converter 107. Other types of processors, such as the Pentium™ processor, manufactured by Intel Corporation of Santa Clara, Calif., may also be used.

In a second embodiment, the analog signal from the sensor transducer is converted into a digital signal through A/D signal converter 107. In this embodiment, a 10 bit A/D signal converter with a +5 Volt reference may be used. Once the signal is converted to a digital signal, controller 108 filters the digital signal to attenuate noise and to stabilize it, and then compares the filtered digital signal to established thresholds in order to determine the status, i.e., detect of no detect, of the sensor. The value of the established thresholds may depend on, inter alia, the type of cooking substance used, the type of sensor used, sensor calibration, and the like. Each sensor may have a uniquely established threshold, or all sensors may use the same established threshold. Further, the established thresholds may be adjusted periodically in order to compensate for a variety of factors, such as the age of the sensors, the accuracy of the sensors, and the like.

In a third embodiment, A/D converter 107 and subsequent filtering performed by controller 108 may be replaced with a comparator. Comparators are known in the art. One of the inputs to the comparator is a reference voltage, which, for example, may represent a threshold voltage value for sensors P1–P3. This reference voltage defines a voltage below which a medium is present at the sensor, and above which a medium is not present at the sensor. If a voltage is higher than the reference voltage, the comparator may generate a "high" voltage signal (a logical "1"), which may be +5 volts, or if the voltage is less than the reference voltage, the comparator may generate a "low" voltage signal (a logical "0"), such as 0 volts. Other types of comparator outputs are possible.

Controller 108 determines the status, i.e., detect or no detect, of each sensor P1–P3 from the signal generated by each sensor. By analyzing all of the sensor statuses, controller 108 may determine liquid level 110 in cooling vessel 102. Additionally, controller 108 may also determine whether or not the apparatus is functioning properly.

Fryer system 100 further includes a display means 114 for displaying liquid level 110 and other related information to a user. Suitable display means 114 may include a plurality of light emitting diodes (LEDs), a cathode-ray tube (CRT), a liquid crystal display (LCD), a seven or thirteen segment display, or any other display that may be used to present information to an operator.

Fryer system 100 may include a drain pan 106 for receiving cooking substance from cooking vessel 102. Drain valve 104 may be used to transfer the cooking substance from cooking vessel 102 to drain pan 106. For example, draining of cooking vessel 102 may be performed periodically in order to replace the cooking substance or to clean the various components of cooking vessel 102. Drain pan 106 may comprise a plurality of drain pan sensors for determining the drain pan liquid level 112 of the cooking substance in drain pan 106.

In a fourth embodiment, two drain pan sensors DP1 and DP2 are provided in drain pan 106. Sensor DP1 may be located near the top of drain pan 106, while sensor DP2 may be located near the bottom of drain pan 106. Sensor DP2 is primarily used to determine whether or not drain pan 106 is empty, and sensor DP1 is primarily used to determine whether or not drain pan 106 is full. In another embodiment, only one sensor is provided. In still another embodiment, a plurality of sensors are provided in order to indicate a plurality of drain pan liquid levels 112. If drain pan 106 is of a cylindrical shape, sensor DP1 may be located within the upper 25% of the volume of drain pan 106, while sensor DP2 may be located within the lower 25% of the volume of drain pan 106. Other geometrical configurations of drain pan 106 may be provided.

In a fifth embodiment, a method for optically sensing liquid level in cooking vessels is provided. Referring to FIG. 3, in step 300, the sensors P1–P3 generate signals based on the amount of light that is reflected back to their respective transducers. As discussed above, these signals may be analog voltage signals. In step 302, an analog voltage signal from one of the sensors may be converted into a digital signal by A/D converter 107. In step 303, controller 108 filters the digital signal to eliminate noise and stabilize the signal. In step 304, controller 108 compares the filtered digital signal to an established upper threshold value, based on, inter alia, the type of cooking substance used, sensor calibration, and the like. If the value of the filtered digital signal is greater than the established upper threshold value, in step 306, the particular sensor is determined to have a status of "Detect." If the value is less than the established upper threshold value, in step 308, the value is then compared to an established lower threshold value, based on, inter alia, the type of cooking substance used, sensor calibration, and the like. If the value is lower than the established lower threshold value, in step 310, the status of the particular sensor is set to "no detect" However, if the value is greater than the established lower threshold value, in step 312, the status of the particular sensor is not changed.

A first value may be used for the established upper threshold, and a second value may be used for the established lower threshold. For example, the established lower threshold may be set at about 1000 A/D converter bits, while the established upper threshold may be set at about 3000 A/D converter bits. Therefore, if the signal has a value that is greater than about 3000 A/D converter bits, the sensor status is set to "No detect." If, however, the signal has a value that is less than about 1000 A/D converter bits, the sensor status is set to "Detect." If a signal has a value that exists in the range of about 1000 to about 3000 A/D converter bits, no changes to the sensor status are made. This provides hysteresis, in that a significant change in signal value is required to change the status of the sensor.

In a sixth embodiment, a comparator may be used to determine the sensor status. The output of the transducer of the sensor is essentially a binary output, so that by entering this value to a comparator, either a high or low output signal is returned by the comparator. Thus, if the signal value is lower than the reference signal value, the sensor status is set to "Detect." If, however, the signal value is greater than the reference signal value, the sensor status is set to "No detect."

Referring again to FIG. 3, steps 304–312 are performed for each sensor that is present, so that prior to step 314, controller 108 has determined the status for each sensor.

Once the status of each sensor is determined, in step 314, controller 108 determines the liquid status in the cooking vessel using the status of each sensor. Referring to Table 1, if P1, P2, and P3 each has a status of "Detect," the liquid level is determined to be above the desired level. If the status of sensor P1 is "No Detect" while the status of sensors P2 and P3 is "Detect," the liquid level is determined to be at the desired level. If the status of each of sensors P1 and P2 is "No Detect" and the status of sensor P3 is "Detect," the liquid level is determined to be below the desired liquid level. If the status of each of the sensors is "no detect," the cooking vessel may be determined to be empty. Suitable messages indicating sensor status and liquid level may be presented by display means 114.

TABLE 1

| Sensor P1 | Sensor P2 | Sensor P3 | Cooking Vessel Liquid Level |
|---|---|---|---|
| Detect | Detect | Detect | Above Desired Level |
| No Detect | Detect | Detect | At Desired Level |
| No Detect | No Detect | Detect | Below Desired Level |
| No Detect | No Detect | No Detect | Empty |

In still another embodiment of the method, controller 108 also may determine the drain pan liquid level in drain pan 106. Sensors DP1 and DP2 and controller 108 perform substantially the same functions as described with respect to steps 300–314 above. Referring to Table 2, the sensor statuses and the liquid level in drain pan 106 may be indicated as follows:

TABLE 2

| Sensor DP1 | Sensor DP2 | Drain pan Liquid Level |
|---|---|---|
| Detect | Detect | Drain Pan Full |
| No Detect | Detect | Liquid Present |
| No Detect | No Detect | Drain Pan Empty |

In step 316, the liquid level 110 of cooking vessel 102 is displayed In addition, the drain pan liquid level may be displayed. Moreover, phrases such as "Low Oil Level," "Oil Level O.K.," "Oil Level Too High," "Cooling Vessel Empty," "Drain Pan Full," "Drain Pan Empty," and the like may be displayed. Other messages corresponding to desired user actions, such as "Cooking Vessel Empty—Add Shortening" or "Drain Pan Full—Do Not Empty Cooking Vessel" may also be displayed.

Steps 300–316 may be repeated at a frequency suitable for providing timely results. For example, the steps are repeated at a frequency of about 300 Hz.

Based on the determination of the status of cooking vessel 102 and drain pan 106, controller 108 may further initiate additional measures to improve safety or efficiency, or both, of fryer operation. For example, if controller 108 determines that cooking vessel 102 is empty or its cooking substance quantity is below the desired level, controller 108 may prevent a user from increasing the heat of cooking vessel 102 without overriding the controller. This may result in a reduction in the possibility of dry firing and may achieve increased efficiency and reduced operating cost.

Moreover, the controller may implement additional safety measures is by prohibiting cooking vessel 102 from being drained into drain pan 106 when controller 108 determines that drain pan 106 is full. In addition, an operator may override controller 108 and drain cooking vessel 102 despite the warning. Controller 108 may implement other safety or efficiency measures as required Controller 108 also may perform error checking. For example, if sensor P3 detects the presence of a cooking substance, but sensor P2 does not detect the presence of a cooking substance, controller 108 may generate a signal indicating that there is a malfunction within the system. Controller 108 may employ display means 114 to display an error message such as "System Malfunction—Check Sensors." Moreover, controller 108 generates a signal to display of the status of each sensor, so that troubleshooting may be performed quickly and efficiently.

While preferred embodiments of the invention have been described in detail with respect to the drawings, it will be understood by those skilled in the art that modifications in form and detail may be made without departing from the spirit and scope of the invention.

What is claimed is:

1. An apparatus for optically sensing a liquid level in a cooking vessel comprising:

a first sensor for detecting a liquid and generating a first signal indicating a vessel level of said detected liquid above a desired liquid level in said cooking vessel;

a second sensor for detecting said liquid and generating a second signal indicating said vessel level of said detected liquid below said desired liquid level in said cooking vessel;

a third sensor for detecting said liquid and generating a third signal indicating whether said vessel is empty; and a controller for receiving said signals and for determining said vessel level in said cooking vessel;

wherein said controller determines that said vessel level is above said desired liquid level when all of said first, second, and third sensors generate said first, second, and third signals that indicate said vessel level of said liquid;

said controller determines that said vessel level is at said desired liquid level when only said second and third sensors generate said second and third signals that indicate said vessel level of said liquid;

said controller determines that said vessel level is below said desired liquid level when only said third sensor generates said third signal that indicates said vessel level of said liquid; and said controller determines that the cooking vessel is empty when none of said first, second, and third sensors generate said signals that indicate said vessel level.

2. The apparatus of claim 1, further comprising a display means for indicating said detected liquid level in said cooking vessel.

3. An apparatus for optically sensing a liquid level in a cooking vessel comprising:

a first sensor for detecting a liquid and generating a first signal indicating a vessel level of said detected liquid above a desired liquid level in said cooking vessel;

a second sensor for detecting said liquid and generating a second signal indicating said vessel level of said detected liquid below said desired liquid level in said cooking vessel;

a third sensor for detecting said liquid and generating a third signal indicating said vessel level of said detected liquid at the bottom of said cooking vessel;

a controller for receiving said signals and for determining said vessel level in said cooking vessel; and a drain pan comprising a drain pan sensor group for generating signals indicating a drain pan liquid level in said drain pan;

wherein said controller receives said signals from said drain pan sensor group and determines the drain pan liquid level in said drain pan.

4. The apparatus of claim 3, wherein said drain pan sensor group comprises:

a first drain pan sensor for generating a first drain pan signal indicating the presence of a drain pan liquid within about 25% of a depth of said drain pan below a top edge; and a second drain pan sensor for generating a second drain pan signal indicating the presence of a drain pan liquid within about 25% of said depth of said drain pan above a drain pan bottom surface.

5. The apparatus of claim 4, wherein said controller determines that said drain pan is full when said first and second drain pan sensors generate said first and second drain pan signals that indicate a drain level of said drain pan liquid.

6. The apparatus of claim 4, wherein said controller determines that said drain pan is empty when neither said first nor said second drain pan sensors generate said second drain pan signal indicating said drain level in said drain pan.

7. A method for optically sensing a liquid level in a cooking vessel comprising:

sensing a vessel level of said liquid above a desired liquid level in said cooking vessel with a first sensor;

sensing said vessel level of a liquid below said desired liquid level in said cooking vessel with a second sensor; and sensing said vessel level of a liquid at the bottom of said cooking vessel with a third sensor;

generating at least one analog signal indicating a vessel level of said liquid at at least one of said sensors;

processing said at least one analog signal;

determining said vessel level of said liquid within said cooking vessel; and displaying said vessel level within said cooking vessel;

wherein said controller determines that said vessel level is above said desired liquid level when all of said first, second, and third sensors generate said first, second, and third signals that indicate said vessel level of said liquid;

said controller determines that said vessel level is at said desired liquid level when only said second and third sensors generate said second and third signals that indicate said vessel level of said liquid;

said controller determines that said vessel level is below said desired liquid level when only said third sensor generates said third signal that indicates said vessel level of said liquid; and said controller determines that the cooking vessel is empty when none of said first, second, and third sensors generate said signals that indicate said vessel level.

8. The method of claim 7, wherein said step of sensing a vessel level of said liquid at a plurality of locations with a plurality of sensors positioned within said cooking vessel, further comprises the steps of:

sensing said vessel level of said liquid above a desired liquid level in said cooking vessel with a first sensor;

sensing said vessel level of a liquid below said desired liquid level in said cooking vessel with a second sensor; and sensing said vessel level of a liquid at the bottom of said cooking vessel with a third sensor.

9. The method of claim 8, wherein said step of determining said vessel level of said liquid within said cooking vessel, further comprises the step of:

determining said liquid level to be greater than a desired level when said status of all of said first, second, and third sensors are "Detect."

10. The method of claim 8, wherein said step of determining said vessel level of said liquid within said cooking vessel, further comprises the step of:

determining said liquid level to be equal to a desired level when said status of only both said second and third sensors is "Detect."

11. The method of claim 8, wherein said step of determining said vessel level of said liquid within said cooking vessel further comprises the step of:

determining said liquid level to be less than a desired level when said status of only said third sensor is "Detect."

12. The method of claim 8, wherein said step of determining said vessel level of said liquid within said cooking vessel further comprises the step of:

determining said cooking vessel to be empty when said status of each of said first, second, and third sensors is "No detect."

13. The method of claim 7, wherein said step of processing said at least one analog signal, further comprises the steps of:

converting said at least one analog signal to at least one digital signal;

assigning a sensor status of "Detect" when a value of said digital signal is less than an established lower threshold; and assigning said sensor status of "No Detect" when said value of said digital signal is greater than an established upper desired threshold.

14. The method of claim 7, wherein said step of processing said at least one analog signal, further comprises the steps of:

comparing each of said at least one analog signal to a reference signal, said reference signal having a value;

assigning a sensor status of "Detect" when an analog signal value is less than the reference signal value; and assigning a sensor status of "No Detect" when an analog signal value is greater than the reference signal value.

15. The method of claim 7, further comprising the step of:

determining a drain pan liquid level.

16. A method for optically sensing a liquid level in a cooking vessel comprising:

sensing a vessel level of said liquid at a plurality of locations with a plurality of sensors positioned within said cooking vessel;

generating at least one analog signal indicating a vessel level of said liquid at at least one of said sensors;

processing said at least one analog signal;

determining said vessel level of said liquid within said cooking vessel;

determining a drain pan liquid level; and displaying said vessel level within said cooking vessel;

wherein said step of determining a drain pan liquid level comprises the steps of:

sensing a drain level of said drain pan liquid at at least one location in said drain pan with at least one drain pan sensor;

generating at least one analog drain pan signal indicating said drain level at said at least one sensor;

determining a status of said at least one drain pan sensor; and determining said drain pan liquid level.

17. The method of claim 16, wherein said step of sensing said drain level of said drain pan liquid at at least one location in said drain pan with at least one drain pan further sensor comprises the steps of:

sensing said drain level of said drain pan liquid within 25% of a depth of said drain pan below a top edge; and sensing said drain level of said drain pan liquid within 10% of the volume of said depth of said drain pan above a drain pan bottom surface.

18. The method of claim 17, wherein said step of determining said drain pan liquid level further comprises the step of:

determining that said drain pan is empty when said status of said first and second drain pan sensors is "No detect."

19. The method of claim 17, wherein said step of determining said drain pan liquid level status further comprises the step of:

determining that said drain pan is full when said status of at least said first drain pan sensors is "Detect."

20. The method of claim 16, wherein said step of determining a status of said at least one drain pan sensor further comprises the steps of:

converting said analog drain pan signals to digital drain pan signals;

filtering said digital drain pan signals;

determining said drain pan sensor status to be "Detect" when a value of said digital drain pan signal is less than an established lower threshold; and determining said drain pan sensor status to be "No detect" when a value of said digital drain pan signal is greater than an established upper threshold.

21. The method of claim 16, wherein said step of determining a status of said at least one drain pan sensor further comprises the steps of:

comparing said drain pan signal to a reference signal;

determining a drain pan sensor status to be "Detect" when a drain pan signal value is less than a reference signal value; and determining a drain pan sensor status to be "No Detect" when a drain pan signal value is greater than a reference signal value.

* * * * *